(12) United States Patent
Brickett (10) Patent No.: US 11,472,056 B2
(45) Date of Patent: Oct. 18, 2022

(54) ROPE SEVERING DEVICE

(71) Applicant: Blue Water Concepts, Inc., Eliot, ME (US)

(72) Inventor: Benjamin P. Brickett, Eliot, ME (US)

(73) Assignee: BLUE WATER CONCEPTS, INC., Eliot, ME (US)

( * ) Notice: Subject to any disclaimer, the term of this patent is extended or adjusted under 35 U.S.C. 154(b) by 76 days.

(21) Appl. No.: 16/793,512

(22) Filed: Feb. 18, 2020

(65) Prior Publication Data

US 2020/0267957 A1 Aug. 27, 2020

Related U.S. Application Data

(60) Provisional application No. 62/808,409, filed on Feb. 21, 2019.

(51) Int. Cl.
*B26D 5/04* (2006.01)
*A01K 29/00* (2006.01)
*B26D 7/14* (2006.01)

(52) U.S. Cl.
CPC .............. *B26D 5/04* (2013.01); *A01K 29/00* (2013.01); *B26D 7/14* (2013.01)

(58) Field of Classification Search
CPC ...................................................... B26D 5/04
USPC ......................... 30/358, 366, 367, 368, 950
See application file for complete search history.

(56) References Cited

U.S. PATENT DOCUMENTS

| | | | | |
|---|---|---|---|---|
| 2,942,818 A * | 6/1960 | Stott | ................... | B23D 15/145 244/150 |
| 3,523,477 A * | 8/1970 | Miller | ................... | B64D 17/386 83/639.4 |
| 3,621,744 A * | 11/1971 | Kelly | ................... | H02G 1/005 83/198 |
| 3,662,634 A * | 5/1972 | Burke | ................... | E21B 29/04 83/861 |
| 3,763,738 A * | 10/1973 | Temple | ................... | B63B 21/60 89/1.14 |
| 3,792,545 A * | 2/1974 | Hendrickson | ......... | A01K 97/24 43/17.2 |
| 3,882,748 A * | 5/1975 | Moore | ................... | B23D 23/00 83/623 |
| 4,026,028 A * | 5/1977 | Green | ................... | B23D 15/14 30/233 |
| 4,052,922 A * | 10/1977 | Bub | ................... | B23D 15/145 83/639.4 |
| 4,057,897 A * | 11/1977 | Seymour | ............... | B23D 23/00 30/272.1 |

(Continued)

*Primary Examiner* — Kenneth E Peterson
*Assistant Examiner* — Richard D Crosby, Jr.
(74) *Attorney, Agent, or Firm* — Hayes Soloway P.C.

(57) ABSTRACT

A rope severing device for cutting a rope after a continued compressive force is disclosed. The rope severing device includes a housing having a base and a top and the top is movably mounted to the base such that the top can move axially with respect to the base. A blade is positioned at least partially within the housing and fixedly mounted with respect to the base. In some embodiments, an elastic member is positioned inside the housing in contact with the base and a damper is attached to the base to dampen relative movement of the top and the base. Upon application of a compressive force to the housing, the top moves toward the base and the blade is at least partially exposed through an opening in the top to sever a rope attached to the rope severing device.

11 Claims, 5 Drawing Sheets

(56) References Cited

U.S. PATENT DOCUMENTS

| | | | | |
|---|---|---|---|---|
| 4,062,112 A * | 12/1977 | Lake | ............ | B23D 15/145 30/228 |
| 4,493,240 A * | 1/1985 | Norton | ............ | B23D 15/145 102/205 |
| 4,690,091 A * | 9/1987 | Persbeck | ............ | B63C 9/22 114/221 A |
| 4,860,698 A * | 8/1989 | Patrichi | ............ | F42B 3/006 123/24 R |
| 5,036,588 A * | 8/1991 | Cherry | ............ | B23D 15/145 30/180 |
| 5,091,987 A | 2/1992 | MacCulloch | | |
| 5,177,317 A * | 1/1993 | Walker | ............ | B23D 15/145 114/221 A |
| 5,857,881 A * | 1/1999 | Zippel, Sr. | ............ | B63C 9/15 441/6 |
| 6,038,807 A * | 3/2000 | Taylor | ............ | A01K 97/24 114/221 A |
| 6,095,838 A | 8/2000 | Brickett | | |
| 6,357,162 B1 * | 3/2002 | Torngren | ............ | A01K 69/00 294/102.1 |
| 6,526,858 B1 * | 3/2003 | Smith | ............ | H02G 1/005 166/54.5 |
| 6,878,024 B1 * | 4/2005 | Kohuth | ............ | B63B 21/04 114/367 |
| 6,928,765 B2 * | 8/2005 | Brickett | ............ | A01K 27/005 43/1 |
| 7,025,254 B1 | 4/2006 | Brickett | | |
| 7,254,917 B2 | 8/2007 | Brickett | | |
| 7,329,163 B2 * | 2/2008 | Brickett | ............ | A01K 75/00 114/221 A |
| 7,743,597 B2 * | 6/2010 | Shnayder | ............ | B63B 21/04 59/93 |
| 8,028,466 B1 * | 10/2011 | Schrock | ............ | A01K 75/00 43/43.12 |
| 9,309,867 B2 | 4/2016 | Brickett | | |
| 9,375,589 B1 * | 6/2016 | Goodman | ............ | A62B 3/005 |
| 10,058,719 B2 * | 8/2018 | Lin | ............ | F41B 15/06 |
| 2004/0200126 A1 * | 10/2004 | Ames | ............ | F16G 11/046 43/43.12 |
| 2005/0060892 A1 * | 3/2005 | Smolders | ............ | B23D 15/14 30/180 |
| 2008/0216327 A1 * | 9/2008 | Yarborough | ............ | B65H 49/08 30/273 |
| 2013/0227795 A1 * | 9/2013 | Franken | ............ | A62B 3/005 29/527.1 |
| 2014/0283390 A1 * | 9/2014 | Hall | ............ | A45D 2/00 30/173 |
| 2015/0033477 A1 * | 2/2015 | Rubin | ............ | F21V 33/0084 7/158 |

* cited by examiner

ROPE SEVERING DEVICE

CROSS-REFERENCE TO RELATED APPLICATION

This application claims the benefit of U.S. Provisional Patent Application No. 62/808,409 filed Feb. 21, 2019, the contents of which are hereby incorporated by reference.

FIELD OF THE DISCLOSURE

The present disclosure relates to devices for severing a rope and, more particularly, to compression-activated rope severing devices, as well as related methods of manufacture and use. The presently disclosed rope severing devices are intended for use in connection with unattended fishing gear to help protect marine wildlife from becoming inescapably entangled in the unattended gear.

BACKGROUND

Earth's oceans are home to many creatures, both large and small. Commercial and hobby fishing activities tend to focus on capturing relatively small oceanic creatures, such as fish, lobster, crabs, and crayfish. Often, traps and gear are left unattended in a fixed position on the ocean floor or suspended from the ocean surface to capture these creatures. After a period of time, the traps and other gear are retrieved to remove the captured marine wildlife. However, while the gear is out in the ocean unattended, the network of lines connecting the gear and marked with connecting buoys can become hazardous to larger marine life, such as whales. Whales can become entangled in these lines and, in many cases, the whales are unable to break free of the lines and the connected gear. These whales can die in great distress, with circulation to various body parts severely restricted due to entanglement in the lines. While a few devices have previously been contemplated to address this issue, the devices previously available have not been sufficiently compatible with the machinery used to retrieve unattended gear. Also, previous devices have not been easily connectable to the gear lines.

SUMMARY

Various rope severing devices are disclosed herein. Specifically, rope severing devices that expose a blade upon compression of the device are described. As described in additional detail below, the disclosed rope severing devices are, in some embodiments, configured to expose a blade contained inside the device to a rope attached to the device upon the application of a desired compression force for a predetermined amount of time. This feature is intended to be useful for various situations, such as when a whale becomes entangled in vertical lines attached to unattended gear. The disclosed rope severing devices may, after experiencing a compressive force applied by a whale or other entangled creature for a given period of time, sever the attached rope to free the entangled creature. Importantly, the disclosed rope severing devices can be configured to tolerate compression forces below a set threshold for severing, including forces from currents, movement within attached traps, and/or forces from retrieval and placement of the gear.

The presently disclosed rope severing devices address deficiencies in the prior art. Specifically, the rope severing devices described herein are configured to sever a line after a compressive force of a predetermined magnitude has been detected on the line for a predetermined amount of time. The severing mechanism employed by the disclosed rope severing devices can thus distinguish forces applied during routine hauling versus a more prolonged strain indicative of a whale encounter and only sever the attached rope when prolonged compressive forces are applied.

Additionally, the disclosed rope severing devices can be mounted to a vertical line (or any other type of rope or line) in a manner that allows for secure attachment without needing to cut or splice the line or rope. In some such embodiments, the rope attached to a rope severing device may easily pass through hauling machinery while the rope severing device follows along as an appendage positioned to the side of the rope in the hauling machinery. Using the disclosed rope severing devices and mounting configurations can advantageously allow the rope severing device to bypass hauler line machinery to allow for safe and consistent line retrieval operation.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

As will be appreciated, the figures are not necessarily drawn to scale or intended to limit the disclosure to the specific configurations shown. For instance, while some figures generally indicate straight lines, right angles, and smooth surfaces, actual implementations of the disclosed devices may have less than perfect straight lines, right angles, and smooth surfaces.

In other words, the figures are provided merely to show some possible example structures. Additionally, for purposes of clarity, not every component may be labelled in every figure. These and other features of the present embodiments will be understood better by reading the following detailed description, taken together with the figures herein described. In the drawings, each identical or nearly identical component that is illustrated in various figures may be represented by a like numeral.

DETAILED DESCRIPTION

Figure 1:
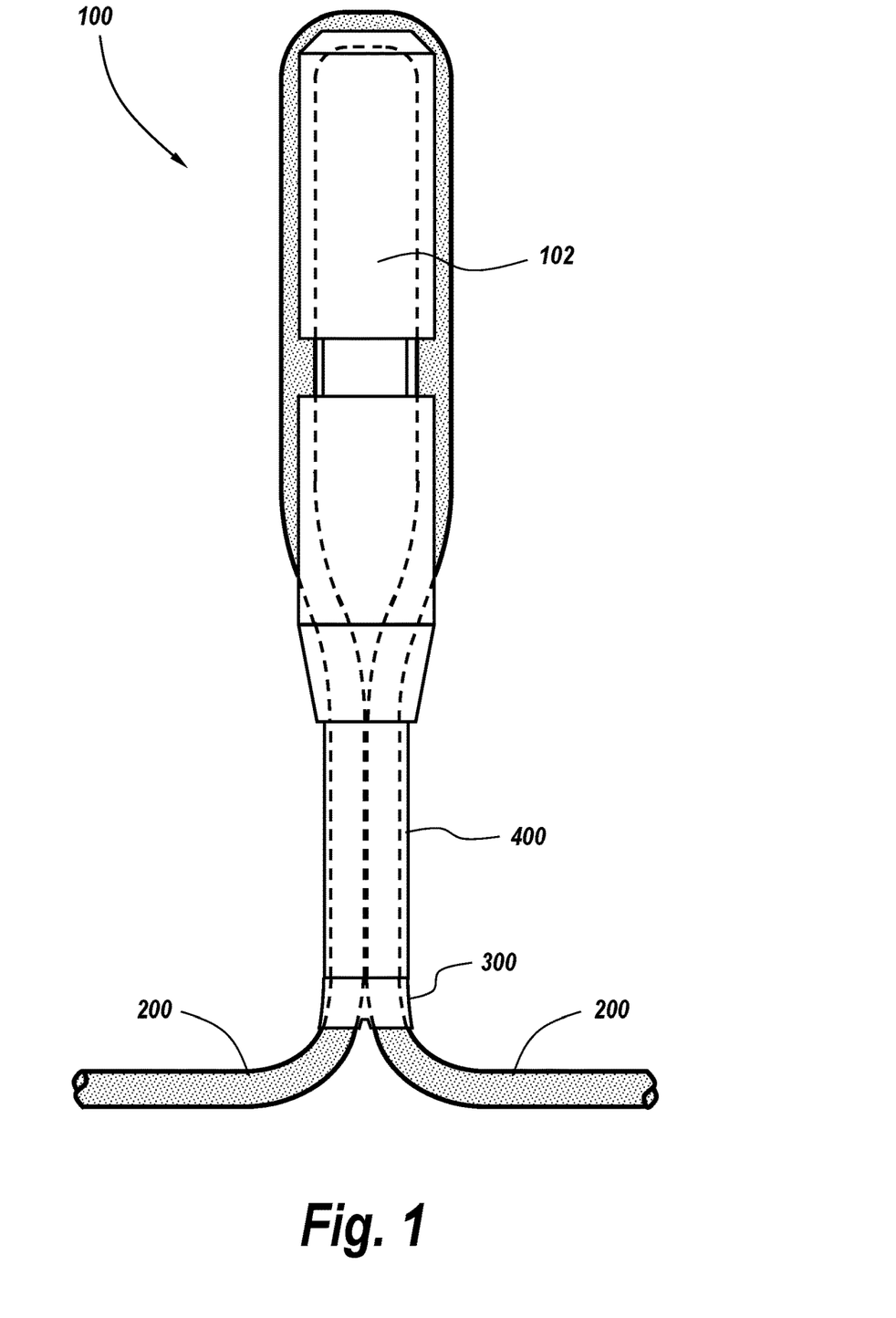
FIG. 1 illustrates an exemplary rope severing device in which a housing is connected to a rope with a collar and tubing, in accordance with some embodiments of the subject disclosure.

FIG. 1 illustrates an example rope severing device 100 having a housing 102 attached to a rope 200. As shown in FIG. 1, rope 200 is looped through a collar 300 and a piece of tubing 400 and surrounds the housing 102. The configuration shown in FIG. 1 can be referred to as a "bight loop"

or an "open loop" configuration. As shown in FIG. 1, in a bight loop configuration, the rope 200 lies across a diameter of the top of the housing 102 with the base of the device facing the collar 300. The rope 200 loops back into the collar 300 (optionally through the tubing 400 positioned between the collar 300 and the housing 102) to form a bight loop.

Features of the housing 102 of the rope severing device 100 illustrated in FIG. 1 are discussed in more detail below with respect to FIG. 2. Referring to the other components illustrated in FIG. 1, it should be noted that rope 200 may be any type of rope, cord, or flexible material suitable for use in marine applications. Although the term "rope" is used throughout the subject disclosure to refer to the material attaching the rope severing device to various other components, the term "rope" should also be understood to encompass other materials, such as lines, wire, cord, and/or string.

As shown in FIG. 1, collar 300 may be oval-shaped and formed of a rigid material, such as steel. Collar 300 may also include sloping sidewalls to provide additional support to the rope 200 as it exits the collar 300 and extends in opposing directions. As will be appreciated by those skilled in the art, collar 300 may reduce chafing of the rope 200. In some embodiments, collar 300 and tubing 400 are separate and distinct, whereas in other embodiments, collar 300 may be integral with tubing 400. In embodiments in which collar 300 is integral to tubing 400, the end of tubing 400 through which the rope 200 exits may have an oval shape while the remainder of the tubing 400 has a substantially cylindrical shape. Numerous configurations and variations are possible and contemplated herein.

Tubing 400 may be implemented with any cylindrical or substantially cylindrical material having a chamber formed therein to accommodate the rope 200. In some embodiments, tubing 400 may be flexible, whereas in other embodiments, tubing 400 may be rigid. In select embodiments, the tubing 400 may be formed of a rubber or neoprene material. In other embodiments, however, the tubing 400 may be formed of a rigid plastic, such as high density polyethylene (HDPE), polycarbonate, acrylic, and/or polyvinyl chloride (PVC). In other embodiments, the tubing 400 may be formed of a metal, such as aluminum, stainless steel, galvanized steel, and/or brass. In some embodiments, the tubing 400 may not be needed and the housing 102 may be secured to the rope 200 using only the collar 300. Numerous configurations and variations are possible and contemplated herein.

The bight loop configuration shown in FIG. 1 for connecting the presently disclosed rope severing device 100 to a rope 200 may also be utilized with other oceanographic instruments, if desired. For example, multiple rope severing devices 100 and/or other oceanographic sensors may be placed along a continuous fishing line without cutting or splicing the fishing line by using a collar 300 as described herein with or without tubing 400 in a bight loop arrangement.

Figure 2:
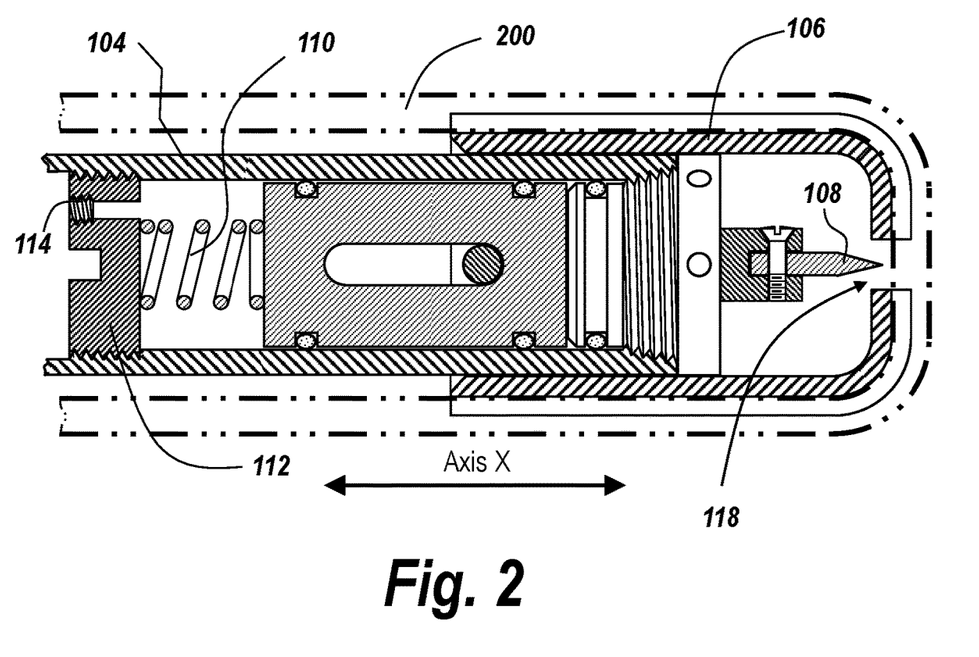
FIG. 2 illustrates a cross-sectional view of a housing of an exemplary rope severing device configured in accordance with some embodiments of the subject disclosure.

FIG. 2 illustrates a cross-sectional view of an exemplary housing 102 for the rope severing device 100. Rope 200 is shown with dotted lining in FIG. 2 to illustrate possible positioning of a rope 200 with respect to the internal features of housing 102. The housing 102 includes a base 104 and a top 106 (which can also be considered a guard). As shown in FIG. 2, the top 106 may be movably mounted to the base 104 such that the top 106 can move axially (i.e., along axis X) with respect to the base 104. The housing 102 also includes a blade 108 positioned at least partially within the housing 102. Blade 108 may be fixedly mounted with respect to the base 104 and, in some embodiments, may be movable relative to the top 106. The blade 108 is arranged so that it will slide toward (and in some cases beyond) an opening in the top 106 when a compressive force acts upon the housing 102. Specifically, upon application of a compressive force to the top 106 and the base 104, the top 106 moves toward the base 104 and the blade 108 is at least partially exposed through an opening 118 in the top 106.

Figure 3A:
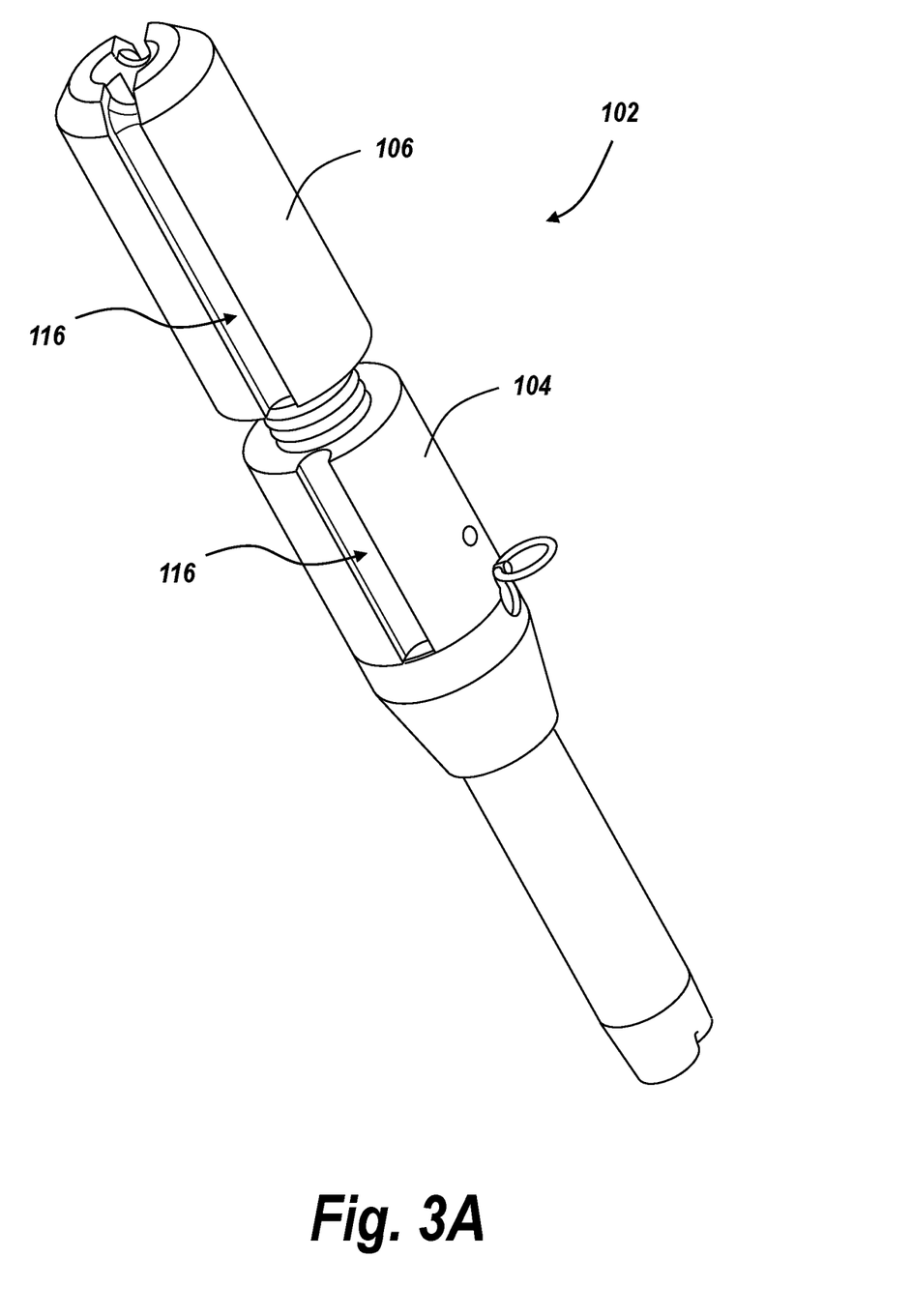
FIGS. 3A and 3B illustrate perspective views of an exemplary rope severing device housing configured in accordance with some embodiments of the present disclosure.
Figure 3B:
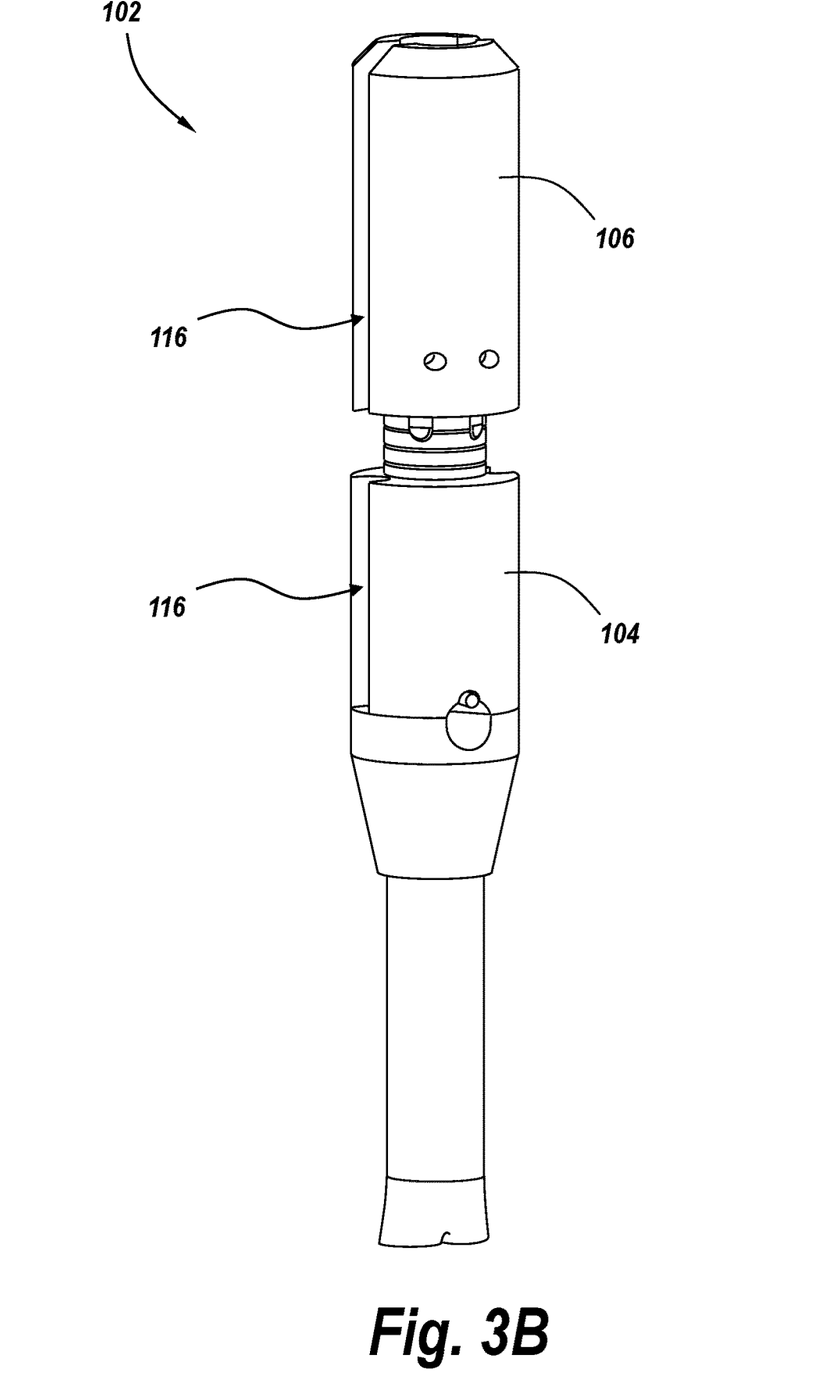

FIGS. 3A and 3B illustrate perspective views of an exemplary rope severing device housing 102. Housing 102 shown in FIGS. 3A and 3B includes bottom portion 104 and top portion 106. In some embodiments, the top 106 of housing 102 can be shaped to securely retain a rope 200. For example, the top 106 may include one more guide notches 116 to accommodate and retain a rope across a diameter of the top, as shown in FIGS. 3A and 3B. In some such embodiments, the one or more guide notches 106 retain the rope in a position directly above the blade 108 and when the top 106 moves toward the base 104, the blade 108 contacts the retained rope.

The housing 102 may also, in some embodiments, include an elastic member 110 positioned inside and in contact with the base 104. In some embodiments, the elastic member 110 may be implemented with a spring or another device having elastic properties. The elastic member 110 may bias the base 104 from moving relative to the top 106 when a compressive force acts upon the housing 102. When a compressive force acts on the housing 102 (specifically when a compressive force pushes the base 104 and the top 106 together), the blade 108 will emerge (at least partially) through an opening 118 in the top 106, toward a rope (illustrated in FIGS. 1 and 2) retained on the top 106. As will be appreciated, the blade 108 will slide toward the rope at the same rate as the base 104 and the top 106 are sliding together. In some embodiments, a tensional trigger may be used to allow the blade 108 to sever the retained rope or line. In some such embodiments, the tensional trigger may be a mechanically straightforward module which, upon meeting a preset tensional load, separates into slidable parts (or violates a pliable or rigid plastic or non-plastic restraint member, or shears a lock pin) to permit the blade 108 to move through the retained rope or line.

In some embodiments, the housing 102 also includes a damper 112 attached to the base 104, as shown in FIG. 2. The damper 112 may dampen the relative movement of the top 106 and base 104. In some embodiments, the damper 112 is configured to create a time-sensitive force threshold that the housing 102 must sustain for a period of time before cutting the rope retained therein. The damper 112 may limit the speed at which the base 104 moves either toward or away from the top 106. In some embodiments, the damper 112 is a hydraulic damper and in select embodiments, the damper 112 is a direct action telescoping hydraulic damper. However, in other embodiments, damper 112 may operate using electronic, pneumatic, or other mechanisms.

In embodiments in which damper 112 is an electronic-based mechanism, an electronic module may be configured to sense the cumulative load lines over a set period of time. Additionally, the electronic module may be configured to react (e.g., release blade 108) upon meeting a preset threshold to permit blade 108 to sever the retained rope or line.

In embodiments in which the damper 112 is a hydraulic damper, the hydraulic damper may have one or more regulators. In some such embodiments, a first regulator may be present that includes a first cylindrical member and a second cylindrical member that are slidably interconnected with a gap formed between the first and second cylindrical members. The gap, if present, may allow hydraulic fluid to pass through the gap when the first cylindrical member moves in relation to the second cylindrical member. As shown in FIG. 2, the damper 112 may also include valve 114 to allow hydraulic fluid to pass between the first and second cylindrical members.

Any suitable type of hydraulic fluid may be used in damper 112. For example, in some embodiments, a blended extract of benign petroleum and/or glycol-based fluids may be used. In these and other embodiments, the hydraulic fluid may possess non-Newtonian viscosity and flow characteristics, which may advantageously provide consistent and predictable displacement of the resistive elements of the damper 112.

The flow of hydraulic fluid in the hydraulic damper can counteract or dampen the force (compressive or otherwise) applied to the housing 102 of the rope severing device 100. Specifically, as compression is applied to the device housing 102, the chamber in which the hydraulic fluid is stored will be pressured, forcing hydraulic fluid to flow through the regulator. In some embodiments, a second regulator may also be present in the hydraulic damper. If present, the second regulator may permit flow of hydraulic fluid in a different direction than the other regulator. Thus, if a rope severing device 100 includes both a first and a second regulator, the first regulator may be configured to permit flow of the hydraulic fluid only when significant compression is applied to the base 104 and the top 106 of the housing 102 and the second regulator may be configured to permit flow of the hydraulic fluid only when little or no compressive force is applied to the base 104 and the top 106 of the housing 102. In some such embodiments, the second regulator may allow the device to automatically reset (e.g., under the force applied by the elastic member 110) after a compressive force is applied, thereby ensuring that the device does not deploy the blade 108 prematurely (such as when retrieving fishing or trapping gear or when compressive forces are exerted for a minimal duration of time).

In these and other embodiments, the rope severing device 100 may include a dump valve in communication with the (hydraulic or other type of) damper 112. This dump value (if present) may contain a mechanically activated pressure relief value which may be set to open once on a certain amount of measured dampened travel of the internal position is achieved. The opening of the relief valve occurs at a point wherein the slidable mechanism allows the cutting blade 108 to come into a close axial position to the tensional rope (or line). Upon acquiring this position, the valve, if present, is mechanically opened to relieve the damping hydraulic pressure and allow the rope to be severed immediately by force of its own tension against the cutting blade 108.

Generally speaking, the rope severing device 100 is configured to tolerate a threshold amount of compressive force for a predetermined period of time (e.g., 10 minutes, 15 minutes, 20 minutes, or more) until the blade 108 emerges from the top 106 of the housing 102. Due to the unique design of the presently disclosed rope severing device 100, the amount of force applied to the housing 102 does not affect the amount of time needed for the device to deploy the blade 108. Thus, a force of 500 pounds or 10,000 pounds would each cause the device to deploy the blade 108 at the desired time or within 10% of the desired time. In some embodiments, the rope severing device 100 can be configured to prohibit motion of the base 104 relative to the top 106 until a compressive force of at least 200 N is exerted on the housing 102 for at least 10 minutes.

Figure 4:
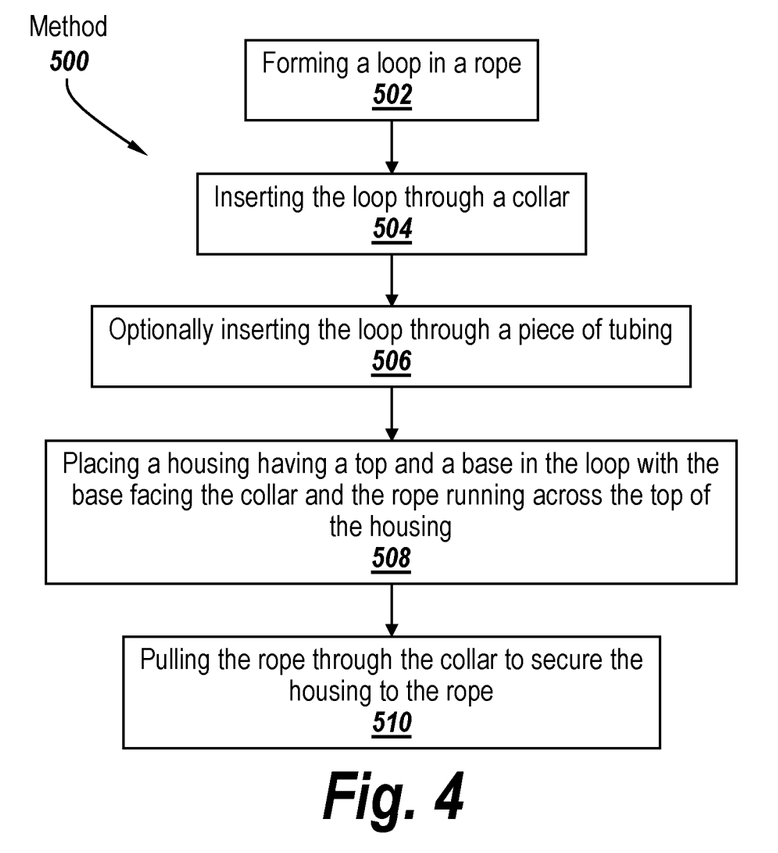
FIG. 4 illustrates an example method of installing a rope severing device in accordance with some embodiments of the subject disclosure.

As previously mentioned, the disclosed housing 102 may be affixed to a rope, line, or other suitable material. FIG. 4 illustrates an exemplary method 500 of forming a rope severing device by affixing a housing as described herein to a rope. As shown in FIG. 4, method 500 includes forming a loop in the rope (Block 502). The rope used in method 500 may be any type of rope, including the materials discussed herein with respect to rope 200. Method 500 continues with inserting the loop through a collar (Block 504). The collar may have any features described herein with respect to collar 300. Also, the collar 300 may be integral to a piece of tubing 400, as previously discussed. Method 500 also optionally includes inserting the loop through a piece of tubing (Block 506). If used, the tubing may be any material discussed herein with respect to tubing 400. Method 500 continues with placing a housing having a top and a base (e.g., the housing 102 previously described in detail) in the loop with the base facing the collar and the rope running across the top of the housing (Block 508). Method 500 also includes pulling the rope through the collar (and the tubing, if present) to secure the housing to the rope (Block 510).

The devices and methods described herein have numerous advantages as compared to previous efforts to minimize marine wildlife entanglement in vertical lines. For example, using the collar described herein (with or without tubing), a rope severing device can be easily attached to an existing rope or line without cutting, spicing, or knotting the line. A rope severing device attached to a line in the disclosed configuration can also be easily detached from that line, if desired, by loosening the loop formed in the rope and sliding the rope severing device out of the loop.

Additionally, the tubing, if present, can allow the rope severing device to be easily manipulated during retrieval of gear. Typically, line hauling systems rely on a series of blocks, fairleads, and pinch-type rotational line hauler winches and it is not possible to have a module that is directly attached to a line pass through the hauling system. In contrast with previous designs, the presently disclosed rope severing device can be mounted on a rope in a bight loop configuration and the collar and rope severing device (with or without tubing present) simply are placed to the side when the line or rope is brought up using winches or other machinery so no significant adjustment is needed in operator movement to remove and/or insert gear having one or more attached rope severing devices.

It should be appreciated that although the accompanying figures illustrate a rope severing device attached to a rope or line, various other devices could alternatively be attached to a rope or line using the disclosed bight loop configuration with a collar and with or without tubing present. For example, in some embodiments, a mounting system is provided that includes an open loop formed in a rope and a collar positioned over the rope. The collar may be positioned such that the rope enters the collar from a first direction, forms a loop, and exits the collar in a second direction opposite the first direction. A device may be retained or held in the loop via a compressive force exerted by the rope on the device. In some embodiments, the mounting system may also include a piece of tubing positioned over the loop between the collar and the device. If present, the tubing may further enable easy manipulation of the device as the rope travels through hauling winches and other machinery. As will be appreciated, the presently disclosed mounting system may be employed with various undersea devices, such as pressure transducers, temperature sensors, underwater depth measurement devices, photosynthetically active radiation (PAR) sensors, or other types of devices.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit the scope of the inventive subject matter described herein. The foregoing description of the embodiments of the disclosure has been presented for the purpose of illustration and is not intended to be exhaustive or to limit the claims to the precise forms disclosed. Persons skilled in the relevant art can appreciate that many modifications and variations are possible in light of the above disclosure.

What is claimed is:

1. A rope severing device comprising:
   a housing comprising a base and a guard, wherein the guard is movably mounted to the base, wherein the guard is axially moveable with respect to the base;
   a blade positioned at least partially within the housing and fixedly mounted with respect to the base;
   a damper attached to the base to dampen movement of the guard relative to the base; and
   a rope positioned about the guard movably engaged with the base and arranged through the base in two locations, wherein, upon application of an outside force tightening the rope, the guard moves toward the base and the blade is at least partially exposed to the rope through an opening in the guard.

2. The rope severing device of claim 1 further comprising an elastic member positioned inside the housing and in contact with the base.

3. The rope severing device of claim 2, wherein the elastic member is a spring.

4. The rope severing device of claim 1, wherein the damper is a hydraulic damper.

5. The rope severing device of claim 1, wherein the damper prohibits motion of the base relative to the guard until the outside force is exerted on the rope for at least 10 minutes, wherein the outside force is at least 200 N.

6. The rope severing device of claim 1, wherein the guard includes one more guide notches to accommodate and retain the rope across a diameter of the top.

7. The rope severing device of claim 6, wherein the one or more guide notches retain the rope in a position axially aligned with the blade and when the guard moves toward the base, the blade contacts the rope.

8. The rope severing device of claim 1 further comprising a rope positioned across a diameter of the top of the housing and extending into a collar positioned at the base of the housing.

9. The rope severing device of claim 8 further comprising a piece of tubing positioned between the collar and the housing, wherein the rope extends through the tubing.

10. A mounting system for the rope severing device of claim 1, the system comprising:
    an open loop formed in the rope; and
    a collar positioned over the loop such that the rope enters the collar from a first direction, forms a loop, and exits the collar in a second direction opposite the first direction;
    the rope severing device of claim 1 positioned within the loop,
    wherein the base of the rope severing device faces the collar,
    wherein the rope severing device is held in the loop via a compressive force exerted by the rope on the rope severing device.

11. The mounting system of claim 10 further comprising a piece of tubing positioned over the loop between the collar and the device.

* * * * *